United States Patent Office 3,483,960
Patented Dec. 16, 1969

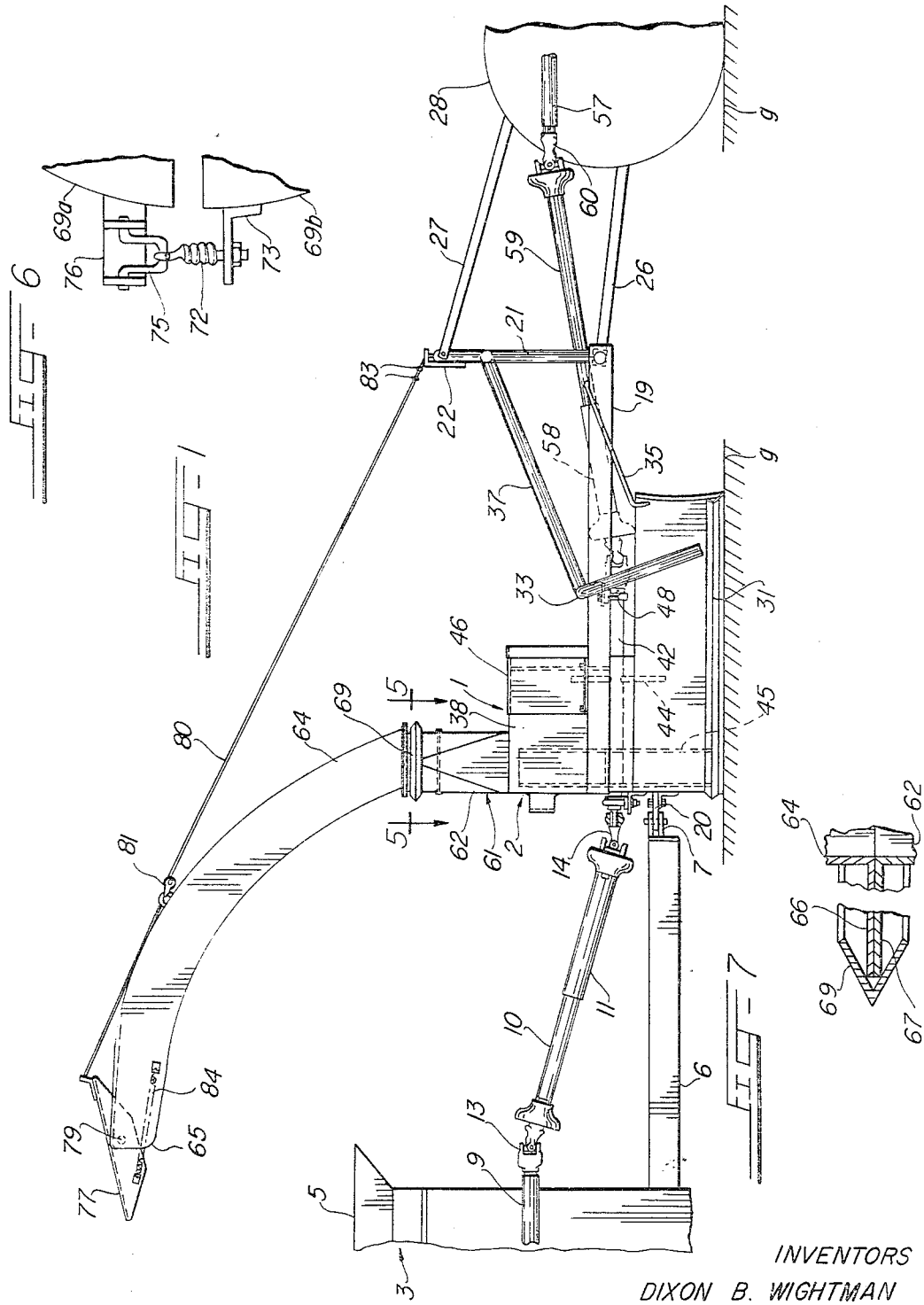

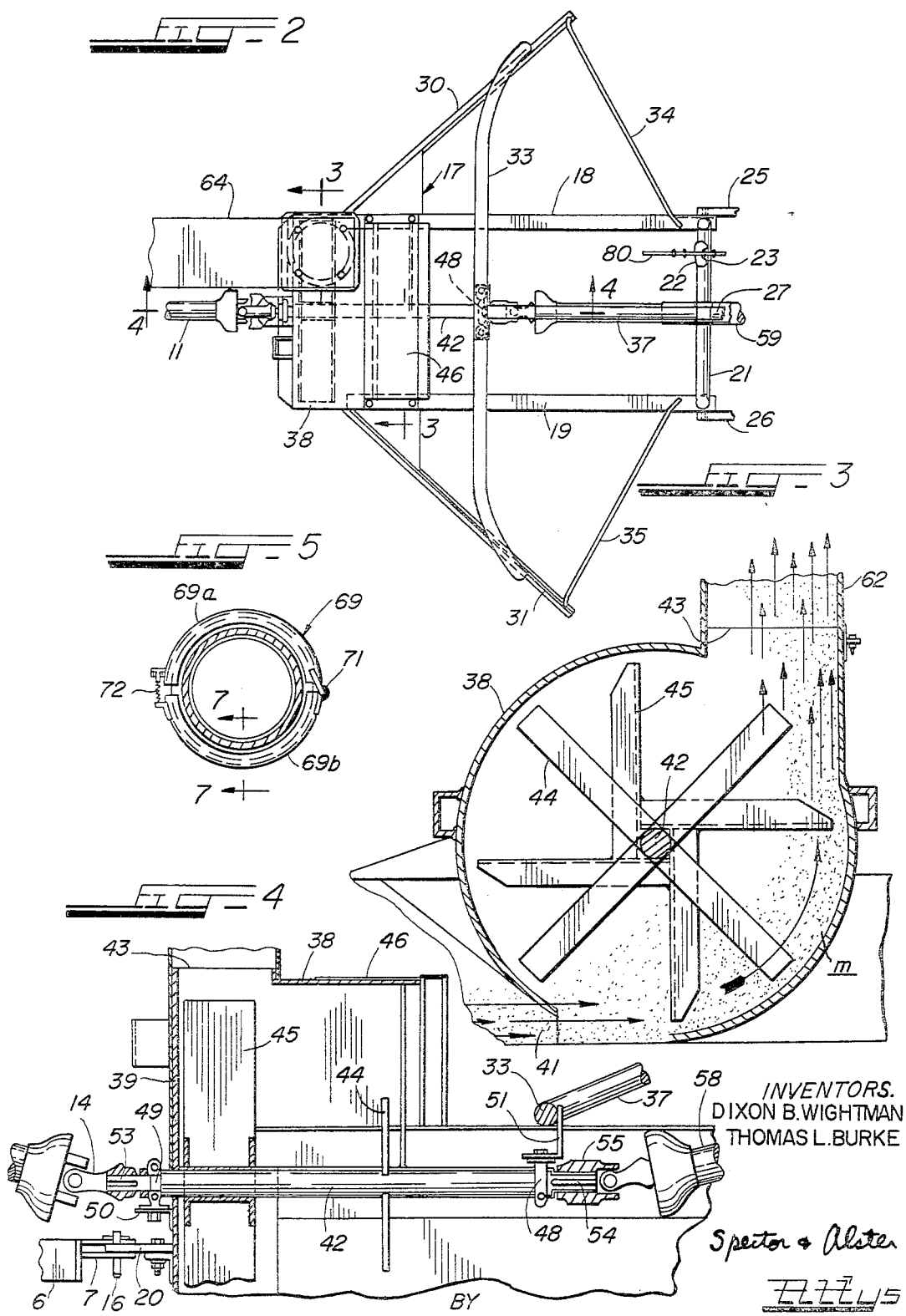

3,483,960
MANURE LOADING APPARATUS
Dixon B. Wightman, Crystal Lake, Ill., and Thomas L. Burke, Waterloo, Iowa, assignors to Allied Farm Equipment, Inc., Chicago, Ill., a corporation of Illinois
Filed Nov. 24, 1967, Ser. No. 685,661
Int. Cl. B65g 65/02
U.S. Cl. 198—7
2 Claims

ABSTRACT OF THE DISCLOSURE

Apparatus for loading poultry litter into a manure spreader comprises a tractor drawn unit having ground-engaging blades that collect the littre from the floor of a poultry house and cause it to be fed to an impeller. The impeller discharges the litter through an upwardly and rearwardly extending chute and into a manure spreader which is moving adjacent to the unit. The spreader may be optionally driven through the power shaft of the unit.

This invention relates generally to manure handling apparatus, and more particularly to a novel apparatus for efficiently handling poultry manure.

In the large-scale production of poultry a problem exists in cleaning the manure from the dirt floors of the buildings in which the poultry is housed. Various methods have been used, including the use of tractor-powered bucket loaders or hand shovels to load the manure into trucks for subsequent disposal or for use as fertilizer. Because the areas of the building floors are quite large, these methods are inefficient and costly.

An object of the present invention is to provide an apparatus which is capable of efficiently pickup up the poultry manure from the building floors and loading it directly into a manure spreader and wherein the same apparatus may be used for spreading the manure from the spreader onto a field for fertilizing of the same. The apparatus is tractor-drawn and is capable of traversing a large area in a relatively short period of time so that the buildings are cleaned of the litter quickly and efficiently.

In a preferred embodiment of the invention the apparatus comprises a manure loading unit and a manure spreader, both of which are drawn in tandem by the tractor. A power take-off from the tractor powers the loading unit during the loading operation. The loading unit has ground-engaging blades for collecting the manure as the apparatus moves over the floor and the collected manure is caused to be fed into an impeller that discharges the manure through a specially designed chute and into the spreader. When the spreader is loaded, it may be unhitched from the loading unit and used to spread the manure into a field. Alternatively, the input or drive shaft of the spreader may be optionally connected to the impeller shaft of the loading unit so that the spreader can be operated directly from the tractor and without having to unhitch the spreader from the loading unit. The aparatus with the through-drive from the tractor to the spreader may also be used to spread sawdust onto the floor of the building.

The attainment of the above and further objects of this invention will be apparent from the following description taken in conjunction with the accompanying drawing forming a part thereof.

In the drawing:

FIG. 1 is a side-elevational view of apparatus constructed in accordance with the embodying this invention;

FIG. 2 is a fragmentary top plan view thereof;

FIGS. 3 and 4 are fragmentary sectional views taken along lines 3—3 and 4—4 respectively of FIG. 2;

FIG. 5 is a fragmentary sectional view, on an enlarged scale, taken along line 5—5 of FIG. 1;

FIG. 6 is an enlarged fragmentary view of a portion of FIG. 5 in the region of the spring connection of the two parts of the chute clamp; and FIG. 7 is a fragmentary sectional view, on an enlarged scale, taken along line 7—7 of FIG. 5.

Referring now in more detail and by reference characters to the drawing, which illustrates a preferred embodiment of the present invention, 1 designates an apparatus comprising a loading unit 2 and a manure spreader 3. The spreader 3 may be of a conventional construction, for instance a spreader that is supported on wheels and is of the so-called drum beater type. The spreader 3 is, therefore, not shown in detail but suffice it to say that it comprises a bin or box 5, a tongue 6 terminating in a clevis 7 and an input shaft 9 for driving the beater and usual conveyor that forms part of the spreader mechanism. The input shaft 9 includes two axially slidable telescoping sections 10, 11, the ends of which have universal joints 13, 14. One of the universal joints 14 is splined for purposes presently more fully appearing.

The loading unit 2 comprises a frame 17 the rear end of which has a short drawbar 20 for receiving a clevis pin 16 by which the spreader tongue 6 may be hitched to the loading unit 2. The frame includes spaced parallel side members 18, 19, and at its forward end of the frame 17 as a downwardly opening upstanding stabilizer support 21 with a L-shaped bracket 22 welded thereto, the bracket having a forwardly opening V-notch 23. Pivotally attached to the side members 18, 19 are hitch bars 25, 26, and pivotally attached centrally of the support 21 is a stabilizer bar 27. The three bars 25, 26, 27 extend toward and connect with a conventional hydraulically operated drawbar mechanism of a tractor 28 or like prime mover in a known manner, whereby the tractor 28 may draw the unit 2 and spreader 3, and may also, through the three-point hitch provided by the bars 25, 26, 27, raise and lower the unit 2 off of and onto the ground or dirt floor g of a poultry building.

Welded or otherwise suitably secured to the rear end of the frame 17 are forwardly and laterally extending blades 30, 31 which form an acute angle and which have moldboards that curve to regions somewhat below the side members 18, 19. A U-shaped cross brace 33 is welded to the rear sides of the blades 30, 31 and extends above the upper edges of the blades and transversely of the frame 17 above the side members 18, 19. Also, struts 34, 35 are secured to the extreme forward ends of the blades 30, 31 and respectively to the side members 18, 19. A brace bar 37 joins the mid-point of the cross brace 33 and the mid-point of the hitch support 21.

Between the side members 18, 19 the frame has a housing 38 of partial cylindrical shape. The housing 38 extends axially from the rear of the frame 17 over a portion of the length thereof and is closed at its rear end by a housing wall portion 39. The housing 38 has a downward and forward intake opening 41 and an upwardly opening discharge 43. Within the housing 38 is an impeller that includes an impeller shaft 42, and breaker blades 44 plus impeller blades 45 mounted thereon and axially spaced apart. The blades 45 operate to discharge material radially and through the opening 43. The impeller shaft 42 is journaled in bearings 48, 49, one being mounted on a bracket 50 outside of and adjacent to the wall portion 39 and the other being mounted on a bracket 51 that is secured to and depends from the cross brace 33.

As best seen in FIG. 4, the ends 53, 54 of the impeller shaft 42 are splined enabling one end 53 to be telescoped into the splined sleeve of the universal joint 14 and the other end 54 to be telescoped into the splined sleeve of a universal joint 55 that is on a power input shaft 57 for loading unit 2. This power input shaft 57 has two axially slidable telescopic sections 58, 59 and an additional universal joint 60. The input shaft 57 is coupled in a conventional manner to the power take-off of the tractor 28.

Projecting upwardly from the housing 38 at the discharge opening 43 is a chute that includes a bonnet 63 and an upwardly and rearwardly extending arcuate main body portion 64, the latter terminating in a discharge end 65 above the spreader box 3. The bonnet 62 and main body portion 64 have adjacent radial flanges 66, 67 (FIG. 7), the two flanges being held together by an annular inwardly opening clamp 69 of V-shaped cross section. As shown in FIG. 5, the clamp is a split ring with two portions 69a, 69b loosely joined at adjacent ends by a hinge 71. The other ends of the clamp are held together by a spring 72 (see FIGS. 5 and 6) that is joined to one clamp portion by a bracket 73. One end of the spring 72 is releasably hooked over a catch bar 75 that is pivoted to a bracket 76 on the other clamp portion. By reason of the foregoing, the orientation of the discharge end 65 may be adjusted to position it over the box 5.

A deflector 77 is pivotally secured by a pivot pin 79 to said discharge end 65 to facilitate an accurate downward deflection of material leaving the chute. A tension spring 84 is connected to the deflector 77 and to the main body 64 and tends to bias the deflector toward closed position or counterclockwise, FIG. 1. The angle of the deflector 77 is controlled by a rope 80 connected thereto and which may be pulled in opposition to the spring 84. The rope passes over a pulley 81 and is anchored in the V-notch 23 of the bracket 22. A series of spaced knots 83 in the rope 80 act as selective stops to hold the rope onto the bracket 22.

In use of the apparatus for loading poultry litter from the ground or floor g into the spreader box 5, the spreader 3 is hitched at its tongue 6 to the loading unit 2 so that the tractor 28 can pull the loading unit 2 and spreader 3 in tandem. The universal joint 14 is uncoupled from the splined ends 53 of the impeller shaft 42, this being possible by reason of the axial telescoping connection of the shaft sections 10, 11. The spreader input shaft 9 will, therefore, not be driven when the impeller shaft 42 is operated from the input shaft 57. The now free end of the input shaft 9 may simply rest on the tongue 6. Conventionally, some sort of a bracket (not shown) is often provided on the tongue of a spreader to support the end of the input shaft when it is uncoupled from a source of power and not in use. Alternatively, however, the input shaft 9 may be left coupled to the impeller shaft 42 and the power to the spreader mechanism may be cut out at a conventional transmission on the spreader and to which the shaft 9 goes by simply shifting that transmission to "neutral."

As the tractor 28 pulls the loading unit 2 and spreader 3, the blades 30, 31 gather the manure m and cause it to enter the housing 38 through the opening 41 where it is discharged by the rotating impeller 45 through the opening 43 from which it enters the chute 62 to the spreader box 5. Any large pieces of material gathered are pulverized by the breaker 44. When the box 5 is loaded the spreader 3 and its shaft 9 may be disconnected from the unit 2. The spreader 3 may then be connected to a tractor in a conventional manner for purposes of spreading the litter onto a field. Alternatively, the power to the spreader mechanism may be reconnected either by shifting the transmission on the spreader from neutral or by recoupling the shaft 9 to the shaft 42, as the case may be. The elevating mechanism on the tractor 2 to which the hitch bars 25, 26 are connected may be utilized to raise the unit so that the blades 30, 31 clear the floor. Then the spreader 3 may be used to distribute its load without the necessity of uncoupling it from the loading unit 2 and without the necessity of uncoupling the loading unit 2 from the tractor 28.

The precise constructions herein shown are illustrative of the principles of the invention. What is considered new and sought to be secured by Letters Patent is:

1. Manure loading and gathering apparatus comprising a frame having spaced apart side members, one end of said frame having means for pivotal attachment of the frame to a prime mover, a housing mounted on said frame and extending between said side members, said housing also extending longitudinally of said side members over portions of the lengths thereof, one axial end of said housing being closed and the other axial end thereof opening downwardly and toward said one end of the frame, a shaft extending through said housing and projecting outwardly through said ends of the housing, said shaft having means adjacent to but outside of said housing for optional coupling with a power input shaft on a manure spreader, an impeller mounted on said shaft and within the housing, a chute projecting upwardly from said housing and having a bonnet and an arcuate main body portion that projects upwardly and rearwardly of the bonnet and behind said closed end of the housing and has a discharge end, means for adjustably clamping said body portion to said bonnet to vary the orientation of said discharge end, ground-engaging blades mounted on said frame and on opposite sides of the housing and diverging toward said one end of the frame for gathering manure and causing it to feed into said open end of the housing for discharge by said impeller through said chute.

2. Manure loading and gathering apparatus according to claim 1 in which said impeller includes blades on said shaft for discharging the manure radially thereof and toward said chute, and breaker elements on said shaft axially spaced from said blades and intermediate the blades an said open end of the housing and across which the manure passes prior to reaching said blades.

References Cited
UNITED STATES PATENTS

| | | |
|---|---|---|
| 2,789,705 | 4/1957 | Eberly. |
| 2,959,266 | 11/1960 | Varnadore et al. _____ 198—7 |
| 3,140,768 | 7/1964 | Marr _____ 198—7 |
| 3,348,652 | 10/1967 | Vinyard _____ 198—7 |

ROBERT G. SHERIDAN, Primary Examiner

U.S. Cl. X.R.

198—128; 214—42